No. 686,115. Patented Nov. 5, 1901.
F. A. McRAE & C. E. ROBERTSON.
AIR COMPRESSOR.
(Application filed Feb. 2, 1899. Renewed Apr. 12, 1901.)
(No Model.)
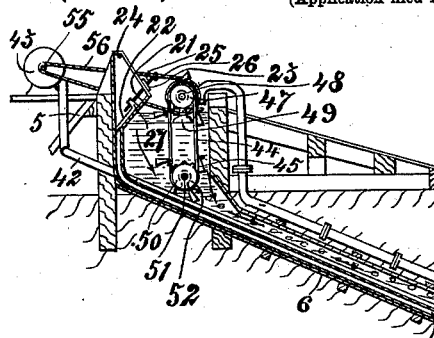
Fig. 1.
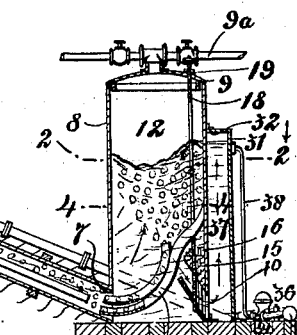
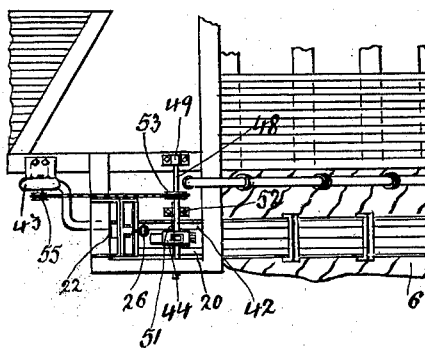
Fig. 2.
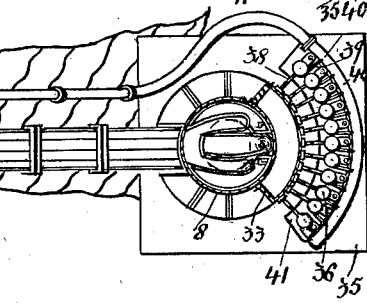
Fig. 4.
Fig. 3.
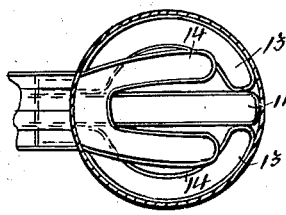
Fig. 5.
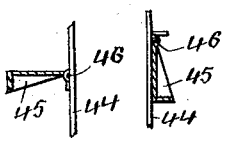
Fig. 6.
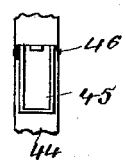
Witnesses:
Inventors:
Finlay A. McRae
Charles E. Robertson
By their Attorney
THE NORRIS PETERS CO., PHOTO-LITHO., WASHINGTON, D. C.

UNITED STATES PATENT OFFICE.

FINLAY ALEXANDER McRAE AND CHARLES EDWIN ROBERTSON, OF MONTREAL, CANADA; SAID ROBERTSON ASSIGNOR OF ONE-HALF HIS RIGHT TO SAID McRAE.

AIR-COMPRESSOR.

SPECIFICATION forming part of Letters Patent No. 686,115, dated November 5, 1901.

Original application filed November 19, 1897, Serial No. 659,212. Divided and this application filed February 2, 1899. Renewed April 12, 1901. Serial No. 55,572. (No model.)

*To all whom it may concern:*

Be it known that we, FINLAY ALEXANDER McRAE and CHARLES EDWIN ROBERTSON, of the city of Montreal, in the district of Montreal and Province of Quebec, Canada, have invented certain new and useful Improvements in Air-Compressors; and we do hereby declare that the following is a full, clear, and exact description of the same.

Our invention relates particularly to hydraulic air-compressors; and it has for its object to provide a plant that will give better results than have been obtainable heretofore in plants for a like purpose and be less expensive to construct.

To these ends the invention may be said briefly to consist of an inclined water-conductor communicating at its upper end with a body of water constituting a water-head, means for introducing air into the water while it is running through said shaft or chute, means for forcing air into said running water at a point where its power of compression is greatest, said shaft or chute communicating at its lower end with a chamber wherein the air and water are separated by improved means, and the air (under the pressure of the said water-head and the water in the shaft or chute) and the water independently utilized for the development of power or for other purposes—such, for instance, as supplying water for consumption.

The broad principle of inclining the water-conductor and other points in connection with said conductor that are incidentally illustrated and described in this application form the subject-matter of an application filed by us the 19th day of November, 1897, under Serial No. 659,212, and of which this is a divisional part. For full comprehension, however, of our present invention reference must be had to the accompanying drawings, forming a part of this specification, in which like symbols indicate the same parts, and wherein—

Figure 1 is a longitudinal vertical sectional view of a hydraulic air-compressing plant embodying our invention; Fig. 2, a part horizontal sectional view taken on line 2 2, Fig. 1, and part plan view thereof; Fig. 3, a detail cross-section illustrating one of the means for facilitating the separation of the air from the water in the receiving-chamber; Fig. 4, an enlarged horizontal sectional view taken on line 4 4, Fig. 1; and Figs. 5 and 6, detail sectional and face views, respectively, of the buckets and a portion of their carrying-belt.

We have illustrated our invention as applied to a stream in which there is a natural fall equal to the depth it is required that the lower end of the inclined water-conductor be sunk.

When our invention is to be applied to a comparatively small stream, it will be found advantageous to construct in any preferred manner a dam 5 in order to provide the required water-head. The inclined water-conductor communicates at its upper end with the space at the foot of this dam and at its lower end with an opening 7 in the lower end of a vertical cylinder 8. The upper end 9 of this cylinder 8 is closed and provided with an opening, to the edges of which an air-conducting pipe $9^a$ is connected, and an opening 10 is provided at the lower end of said cylinder and diametrically opposite to the opening 7, while a series of, preferably five, concavo-convex vanes are provided and arranged in two tiers, three being in the lower tier and separated from one another and two in the upper tier and over the spaces between the vanes in the lower tier. The center vane 11 of the lower tier is secured at one end to the lower side of the lower end of the flume and extended upwardly within the chamber 12 (formed by the cylinder 8) in a compound curve, as shown in Fig. 1, in order to accommodate a gate or valve 15, to be presently described, while the two side vanes 13 are secured within the lower end of the flume and extended concentrically of the chamber 12 on the same curved plane and to within a short distance of one another, the vanes 14 of the upper tier being also curved upwardly and toward one another. (See Fig. 2.) The gate 15 is located in suitable guideways 16, formed upon the interior of the cylinder 8 on each side of the opening 10, which opening said gate is caused to control by means of a rod, preferably screw-threaded for a portion of its length, as at 18, and taking through a screw-threaded bearing 19 in the top of the cylinder and a boring in the vane 11. This gate serves primarily as a means for clearing out the bottom of the cylinder, which can be done by opening it to its fullest extent and shutting off the air-supply. Thus the water, being released of the friction due to the compression of the air, will travel at its greatest velocity and carry with it the dirt that will be precipitated while the water is traveling at its normal rate and compressing air. The air is supplied to the water passing through the conductor by means of a tube 20, extending from a point above the level of the water-head to preferably a short distance beyond the point 6$^a$. The upper end of the tube 20 is flared to provide a guiding-surface 21, on which a valve or gate 22 slides and opens or closes the upper end of said tube, this gate being operated by a screw-threaded spindle 25, (provided with a hand-wheel 26,) taking through a screw-threaded bearing 23, formed upon a brace 24 and rotatably connected to a bracket 27, secured rigidly upon said gate.

In order to utilize the water discharged through the opening 10 to generate power or to be supplied, as before mentioned, for consumption, we inclose that portion of the exterior of cylinder 8 on each side of and adjacent to said opening 10 and from the bottom of the cylinder to within a short distance of the top thereof by a plate 31, having its top and side edges 32 and 33, respectively, inwardly offset and connected, preferably by riveting, to the outside surface of the cylinder 8, while the lower edge of this plate and the lower edge of the cylinder are rigidly connected in any desired manner to a base-section 35. A series of hydraulic rams (indicated at 36) are connected to the water-chamber 37, intermediate said plate 31 and the cylinder 8, by pipes 38, and by pipes 39 to a delivery-pipe 40, through which the water is forced by said rams preferably back to the water-head, although, if desired, it may be connected to any suitable hydraulic plant, where it may be converted into power for commercial purposes or supplied for consumption, as before mentioned, the overflow from the rams being allowed to run away, preferably through a ditch 41, to the lower level of the stream.

At different seasons, as is well known, all streams vary in depth or volume, and therefore if provision is not made to counteract this variation a constant supply of air cannot be maintained, as the water-pressure in the flume and the speed of the water therethrough will increase or decrease according as the water-head increases or decreases, and consequently the force of suction exerted by the water flowing through the flume upon the air in the tube 20 will at times be reduced until it will be hardly sufficient to draw said air and convey it to the chamber 12. To obviate this difficulty, we provide a second air-supply pipe 42 and extend same inside of the flume and from a blower or fan (of any preferred construction and mounted and located, preferably, as indicated at 43) to within a short distance of the lower end of the flume. This blower or fan may be driven in any approved manner; but we prefer to drive same by means of an endless belt or loop 24, carrying a series of tilting buckets 45, (preferably of the form shown in Figs. 5 and 6,) pivotally connected to said belt, preferably as at 46. This belt takes over a sprocket-wheel 47, mounted rigidly upon a shaft 48, carried in bearings 49, extending above the level of the water and mounted upon the dam-timbers, and a sprocket-wheel 50, carried upon a shaft 51, mounted, preferably adjacent to the mouth of the flume, in bearings 52 and in a perforation in the dam-timbers, a pulley 53 being rigidly secured upon said shaft 48 and operatively connected to the pulley 55 of the blower by a belt 56.

It will be obvious by reference particularly to Figs. 1, 5, and 6 that the action of the water as it flows downwardly through the flume will cause the buckets 45 on one side of the loop to tilt out to a position at right angles thereto, and thereby draw that portion of the belt down, while the same action of the water will tilt the buckets on the other side of the loop flat against the belt, which is in this manner caused to rotate, the rotary movement being imparted to the blower through the belt 56.

What we claim is as follows:

1. In combination with a suitable water-head, a water-conductor communicating at its upper end with said water-head, means for introducing air into the water while passing through said conductor at a point near the lower end thereof, and means located at the lower end of said conductor for separating said air and water, for the purpose set forth.

2. In combination with a suitable water-head, a water-conductor communicating at its upper end with said water-head, means for forcing air into the water while passing through said conductor at a point near the lower end thereof, and means located at the lower end of said conductor for separating said air and water, for the purpose set forth.

3. In combination with a suitable water-head, a water-conductor communicating at its upper end with said water-head, means for introducing air into the water while passing through said conductor, a cylinder, an inlet-opening thereto, the lower end of said conductor being connected to and communicating with said opening, a series of upwardly-extending deflecting-vanes independent of one another, located within said cylinder at said opening and arranged in two tiers, an air-conducting pipe communicating with the upper end of said chamber and a water-discharge opening from said chamber, for the purpose set forth.

4. In combination with a suitable water-head, an inclined water-conductor communicating at its upper end with said water-head, means for introducing air into the water while passing through said conductor, a cylinder, an inlet-opening thereto, the lower end of said conductor being connected to and communicating with said opening, a series of upwardly-extending deflecting-vanes independent of one another, located within said cylinder at said opening and arranged in two tiers, the vanes of the upper tier being over the spaces between the vanes of the lower tier, an air-conducting pipe communicating with the upper end of said chamber and a water-discharge opening from said chamber, for the purpose set forth.

5. In combination with a suitable water-head, a chamber or receptacle having a water-inlet, an outlet at its lower end and an air-outlet at its upper end, a water-conductor communicating at its upper end with said water-head and at its lower end with the water-inlet opening of said chamber; air-forcing means; and an air-conducting pipe leading from said air-forcing means to a point within the conductor in close proximity to said chamber, for the purpose set forth.

6. In combination with a suitable water-head, an inclined water-conductor communicating at its upper end with said water-head; a cylinder; an inlet-opening to said cylinder; the lower end of said conductor being connected to and communicating with said inlet-opening; a series of upwardly-extending deflecting-vanes independent of one another and located within said cylinder at said opening; air-forcing means consisting of a blower; an air-conducting pipe leading from said blower to a point within the conductor in close proximity to said cylinder; means operated by the flowing water of said water-head for actuating said blower; said cylinder having a water-discharge opening and an air-outlet, substantially as and for the purpose set forth.

7. In combination with a suitable water-head, an inclined water-conductor communicating at its upper end with said water-head, a cylinder, an inlet-opening thereto, the lower end of said conductor being connected to and communicating with said opening, a series of upwardly-extending deflecting-vanes independent of one another, located within said cylinder at said opening, a blower or the like, an air-conducting pipe leading from said blower to a point within said conductor and in close proximity to said cylinder and means operated by the flowing water of said water-head for simultaneously actuating said blower or the like and supplying air globules to the water flowing into said inclined conductor, and a water-discharge opening from said cylinder and an air-outlet from said cylinder, for the purpose set forth.

8. In combination with a suitable water-head, an inclined water-conductor communicating at its upper end with said water-head, a cylinder, an inlet-opening thereto, the lower end of said conductor being connected to and communicating with said opening, a series of upwardly-extending deflecting-vanes independent of one another, located within said cylinder at said opening, a blower or the like for forcing air into said cylinder, an air-conducting pipe leading from said blower to a point within said conductor and in close proximity to said cylinder, a suitably-mounted shaft located above the surface level of the water-head, a pulley mounted upon said shaft, an endless belt taking over said pulley and extending to within a short distance of the upper end of the conductor, a series of tilting buckets pivotally secured to said belt, a second pulley mounted upon said shaft and an endless belt operatively connecting said second pulley to said blower, a water-discharge opening from said cylinder and an air-outlet from said cylinder, substantially as and for the purpose set forth.

In testimony whereof we have affixed our signatures in presence of two witnesses.

FINLAY ALEXANDER McRAE.
CHARLES EDWIN ROBERTSON.

Witnesses:
WILLIAM P. McFEAT,
FRED. J. SEARS.